US008123888B2

(12) United States Patent
Hammami et al.

(10) Patent No.: US 8,123,888 B2
(45) Date of Patent: Feb. 28, 2012

(54) FIBER REINFORCED POLYMER OILFIELD TUBULARS AND METHOD OF CONSTRUCTING SAME

(75) Inventors: Ahmed Hammami, Edmonton (CA); Todd Yakimoski, Beaumont (CA); Bernadette Craster, Edmonton (CA); J.R. Anthony Pearson, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 458 days.

(21) Appl. No.: 12/431,323

(22) Filed: Apr. 28, 2009

(65) Prior Publication Data

US 2009/0236091 A1    Sep. 24, 2009

(51) Int. Cl.
B32B 37/00   (2006.01)
B65H 81/00   (2006.01)
(52) U.S. Cl. .................... 156/175; 156/169; 156/173
(58) Field of Classification Search .............. 156/169, 156/173, 175
See application file for complete search history.

(56) References Cited

U.S. PATENT DOCUMENTS

| | | | | |
|---|---|---|---|---|
| 3,313,670 A | * | 4/1967 | Sherwood ............... | 156/359 |
| 4,867,834 A | * | 9/1989 | Alenskis et al. ........ | 156/433 |
| 4,892,764 A | | 1/1990 | Drain | |
| 5,045,147 A | * | 9/1991 | Benson et al. ........... | 156/429 |
| 5,051,226 A | * | 9/1991 | Brustad et al. .......... | 264/511 |
| 5,266,139 A | * | 11/1993 | Yokota et al. ............ | 156/169 |
| 5,290,389 A | * | 3/1994 | Shupe et al. ............. | 156/425 |
| 5,363,929 A | * | 11/1994 | Williams et al. ......... | 175/107 |
| 6,084,052 A | | 7/2000 | Aufdermarsh et al. | |
| 6,240,971 B1 | * | 6/2001 | Monette et al. .......... | 138/153 |
| 6,359,107 B1 | | 3/2002 | Connell et al. | |
| 6,752,190 B1 | * | 6/2004 | Boll et al. ............... | 156/433 |
| 2002/0070024 A1 | | 6/2002 | Schutz | |
| 2006/0066102 A1 | | 3/2006 | Leslie et al. | |

OTHER PUBLICATIONS

Beckwith, Filament Winding—"Filament Winding—The String and the Glue" Jan. 1998, XP002605585 Retrieved from the Internet: URL:http://tinyurl.com/3523ypz.
Mertiny and Ellyin, Performance of High-Pressure Fiber-Reinforced Polymer Composite Pipe Structures, ASME Pressure Vessels and Piping Division Conference, 2006, pp. 1-7, ASME, Canada.
Mertiny and Ellyin, Joining of Fiber-Reinforced Polymer Tubes for High-Pressure Applications, Polymer Composites, 2006, pp. 99-109, Society of Plastic Engineers, Canada.
Brusser, Selection Criteria on Oilfield Tubulars, STAR Fiber Glass Systems BV, pp. 418-428, Netherlands.
High Temperature Composite Materials, UBE Aerospace Materials, pp. 1-16, UBE Industries ltd.
Mertiny and Ellyin, Selection of Optimal Processing Parameters in Filament Winding, 33rd International SAMPE Technical Conference, 2001, Seattle, WA.

(Continued)

Primary Examiner — Jeff Aftergut
(74) Attorney, Agent, or Firm — Robert A. Van Someren; Wayne I. Kanak

(57) ABSTRACT

A technique facilitates construction of high temperature fiber reinforced polymer oilfield tubulars. The technique comprises a method of combining a fiber material and a high temperature thermoset resin to create a high performance composite material. The composite material is formed into an oilfield tubular that can be used in a variety of downhole applications. The method of combining the high performance materials with low modulus, high temperature coating materials during the manufacturing process produces composite tubular products that can survive prolonged exposure to deleterious well fluids in high temperature and high pressure downhole environments.

1 Claim, 8 Drawing Sheets

OTHER PUBLICATIONS

Yuan and Goodson, Hot-Wet Downhole Conditions Affect Composite Selection, Oil & Gas Journal, 2007, pp. 52-63, USA.

Yuan and Goodson, HT/HP Hot-Wet Thermomechanical Properties and HT/HP In-Situ Mechanical Test Method of High-Temperature Polymer Composites, USA.

Mondo, Hauber. Langone, and Quinn, High Speed Processing of Thermoplastic Composites for Oilfield Pipe and Tubular Applications, Composite Materials for Offshore Operations-3.

Composites by Design, Advanced Composite Processes, OSHA Technical Manual, Section III, Chapter 1, Polymer Matrix, pp. 1-9.

Leslie, Leslie II, Heard, and Truong, Advances in Composite Drilling Components Lead to Evaluation for Critical E&P Applications, Drilling Contractor, Jul./Aug. 2007, pp. 78-82.

Perabo, BMI Resins as Low-Stress Alternatives to Epoxies for Semiconductor Package Assembly, San Diego, CA.

Kaizawa, Maruoka, Kawai, Kamano, Jozuka, Senda, and Akiyama, Thermophysical and Heat Transfer Properties of Phase Change Material Candidate for Waste Heat Transportation System, Heat Mass Transfer, 2008, pp. 763-769, vol. 44, Springer-Verlag.

Black, Are High-Temperature Thermoset Resins Ready to Go Commercial?, High Performance Composites, 2004, pp. 1-7, Gardner Publications.

Mertiny and Ellyin, Influence of the Filament Winding Tension on Physical and Mechanical Properties of Reinforced Composites, Composites, 2002, pp. 1615-1622, Part A 33, Elsevier, Canada.

Mertiny, Ellyin, and Hothan, Stacking Sequence Effect of Mulit-Angle Filament Wound Tubular Composite Structures, Journal of Composite Materials, 2004, pp. 1095-1113, vol. 38, Sage, Canada.

* cited by examiner

FIBER REINFORCED POLYMER OILFIELD TUBULARS AND METHOD OF CONSTRUCTING SAME

BACKGROUND OF THE INVENTION

1. Field of the Invention

Oilfield applications often present challenging operational requirements with respect to equipment used downhole. Requirements of oilfield equipment may include high strength, resistance against chemical attack by harsh well fluids, maintenance of mechanical properties at high temperatures, transparency to nuclear, magnetic, acoustic, and inductive energy, as well as a variety of other requirements. Attempts have been made to use fiber reinforced polymer tubular components in oilfield applications, but the challenging operational requirements can limit the effectiveness of these components.

2. Description of Related Art

In the polymer composites industry, resin systems used to manufacture advanced composites generally are either thermosetting resin systems or thermoplastic resin systems. Thermosetting resin systems use a curing agent, sometimes referred to as a hardener, which acts as a catalyst to facilitate curing of the thermosetting resin to a hard polymer material. Such materials are useful in a wide variety of applications. However, the survival of such products downhole can be limited because of the harsh wellbore environment. For example, wellbore environments may subject the material to extreme pressures, temperatures, vibrations, and harsh/corrosive fluids, such as water with varying pH levels. Fiber reinforced polymers, for example, incur severe loss of tensile strength with prolonged exposure to brine, $CO_2$ and $H_2S$ at elevated temperatures.

Furthermore, water in the well environment permeates through the polymer matrix and acts as a plasticizer which reduces the glass transition temperature of the material. Water can also react with the glass fibers in fiber reinforced polymers in a manner that causes leaching of ions, surface shrinkage, and cracking. The interface between the glass fibers and the polymer matrix can also be attacked by the ingress of water into the composite material, causing loss of interfacial strength as a result of de-bonding of the polymer from the glass fibers. Accordingly, the longevity of fiber reinforced polymeric materials in well environments can be limited.

BRIEF SUMMARY OF THE INVENTION

In general, the present invention provides high temperature fiber reinforced polymer oilfield tubulars and a methodology for constructing such tubulars. The oilfield tubulars are formed of a composite material comprising a high strength fiber material and a high temperature thermoset resin and can be used in a variety of downhole applications. The methodology comprises combining a high strength fiber material and a high temperature thermoset resin to create a high performance composite material, and winding such composite material around a mandrel while applying sufficient heat to the material at the point of winding to maintain the thermoset resin above its melting temperature. Additionally, a coating material may be applied to the composite material in a manner that prevents exposure of the composite material to deleterious fluids during use of the oilfield tubular in the downhole environment.

BRIEF DESCRIPTION OF THE DRAWINGS

Certain embodiments of the invention will hereafter be described with reference to the accompanying drawings, wherein like reference numerals denote like elements, and.

DETAILED DESCRIPTION OF THE INVENTION

Figure 1:
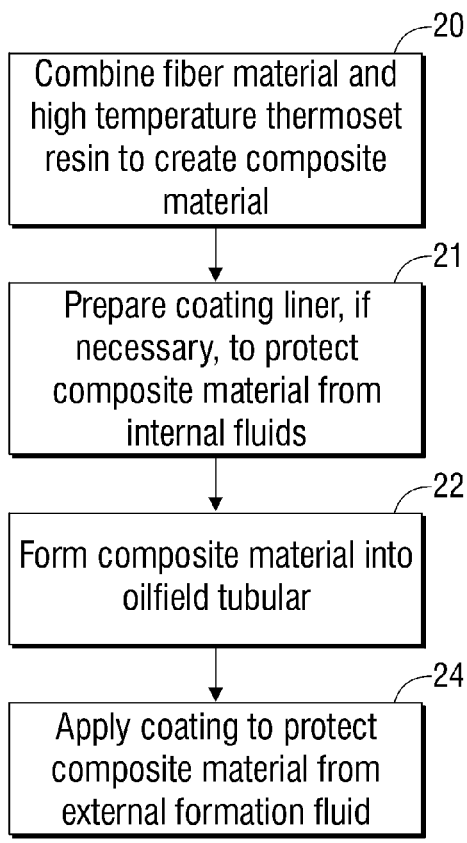
FIG. 1 is a flowchart illustrating one example of a methodology for forming a polymer composite tubular product for use in a well environment, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible.

The present invention relates to polymer composite oilfield tubulars that may be used in high temperature well environments and a methodology for constructing such tubulars. Oilfield tubulars include, but are not limited to, well casing, production tubing, flow lines, core holders, bridge plugs, liners, and tool housings, such as for logging tools. The composite oilfield tubulars are constructed from composite materials that enable use of the tubulars in a variety of applications that are not conducive to the use of standard metal tubing and tool housings. For example, the composite tubulars are transparent to nuclear, magnetic, acoustic, and inductive energy, which allows such tubulars to be used in a variety of logging operations in observation wells.

In one example, the oilfield tubulars are formed by combining a high strength fiber material with a high temperature thermoset resin to form the desired high performance tubular. The resulting high temperature, fiber reinforced polymer oilfield tubular can be used in high temperature well environments, such as environments up to and even above 200° C. Additionally, the processes outlined herein for constructing and curing the composite oilfield tubulars avoid the detrimental foaming, shrinking, cracking, and other detrimental effects associated with high temperature thermoset resins. The composite oilfield tubular may also be coated internally and/or externally with a cost effective coating material. The coating material protects the load bearing composite tubular from downhole fluid ingress which, in turn, preserves the mechanical properties of the composite tubular established under dry conditions for the life of the tubular in the downhole environment.

The fiber material may comprise a variety of materials, such as carbon, fiberglass, for example E-glass, ECR-glass, R-glass, or S-glass, basalt, quartz, aramid fiber, or other fiber materials. The thermoset resin may be selected from several resin systems, including polyimides, cyanate esters, benzoxazines, epoxies, phenolics, polyurethanes, and polyamides. By way of specific example, the thermoset resin may be selected from available bismaleimides (BMI) or various modified/toughened BMI resins. Examples of commercially available thermoset resins that can be used to create the oilfield tubulars include, but are not limited to, Xponent, RS-8HT, RS-8PI, RS 9, RS 51, RS 52, PMR-II-50, AFR700B, DMBZ-15, and HFPE-II-52, available from YLA, Inc. of Benicia, Calif., USA, RS 3, EX 1505, and EX 1551, available from TenCate of Almelo, the Netherlands, AVIMID K3B, AVIMID N, AVIMID R, AVIMID RB, CYCOM 944, CYCOM 2237, CYCOM 3002, CYCOM 3010, CYCOM 5004, CYCOM 5245C, CYCOM 5250-4, CYCOM 5270, and CYCOM 5575, available from Cytec Industries Inc. of West Paterson, N.J., USA, F650, F652, F655, and M65, available from Hexcel Corporation of Stamford, Conn., USA, RP-46, available from Unitech Corporation of Hampton, Va., USA, SuperImide, available from Goodrich Corporation of Arlington, Va., USA, and PETI 330 and PETI 365, available from UBE Industries Limited of Tokyo, Japan. The coating materials applied to the oilfield tubular base structure depends on the underlying composite material, but often the coating material is a curable material selected to fully bond with the underlying matrix. An example of a suitable coating and process for forming the coating is described in co-pending U.S. patent application Ser. No. 12/428,711, which is incorporated herein by reference.

The composite material may be formed with other additives to affect the properties of a given structure. For example, fillers may be added to alter the flexural strength of the composite material or to affect other properties, e.g. conductivity, of the composite material. Often the amount of filler material added is less than five percent by weight. Examples of fillers include kaolinite, illite, montmorillonite, mica, and silica (in the form of spheres or plates), all of which can be pretreated with, for example, maleimide functionalized silane, aminopropyl silane, sulfide, or fluorinated silane. Alternatively, the fillers may be organic material in the form of spheres, plates, or fibers.

Referring generally to FIG. 1, a flowchart is provided to illustrate one general methodology for manufacturing polymer composite oilfield tubulars. In this example, a high strength fiber material is combined with a high temperature thermoset resin to create a composite material, as illustrated by block 20. If an internal coating is desired, a coating liner may be prepared for placement along an interior surface of the polymer composite oilfield tubular to protect the composite material from internal fluids routed through the tubular, as illustrated by block 21. The composite material is then formed into a oilfield tubular, as illustrated by block 22.

As explained in greater detail below, one method for forming the composite material into the oilfield tubular is to impregnate a roving of high strength fibers with high temperature thermoset resin and curing agent using commercial prepreg machines and processes. The impregnated roving is wound onto cores or bobbins and is used for filament winding. These impregnated fibers are commonly referred to as tow pregs. Alternatively, woven fabrics and unidirectional tape (whereby fiber meshes are preset and pre-oriented) may be impregnated with the desired high temperature thermoset resin and a curing agent. The fabrics and tapes are provided as continuous rolls, such as rolls having widths up to 72 inches (183 cm) and lengths up to several hundred feet (meters). The fabric or tape thickness constitutes one ply in the construction of a multi-ply lay-up. A slitting machine may be used to slit the prepreg sheets and/or tape to produce slit tapes of desired tape widths. Some of these slit tapes can be used in fiber winding machines in much the same way as the tow pregs. Once the resin mixture has been impregnated onto the fabrics, roving, and/or tapes, the prepreg is stored in a refrigerator or freezer until ready for use in the manufacturing process. The cold storage prevents the chemical reaction from occurring prematurely. Once ready for manufacture, the tow pregs or slit tapes are wound over a pre-heated mandrel designed to create an oilfield tubular structure of desired diameter and length. In addition, an external coating may be applied along an exterior of the composite material to protect the composite material from formation fluids while the oilfield tubular is used in a downhole environment, as illustrated by block 24.

Figure 2:
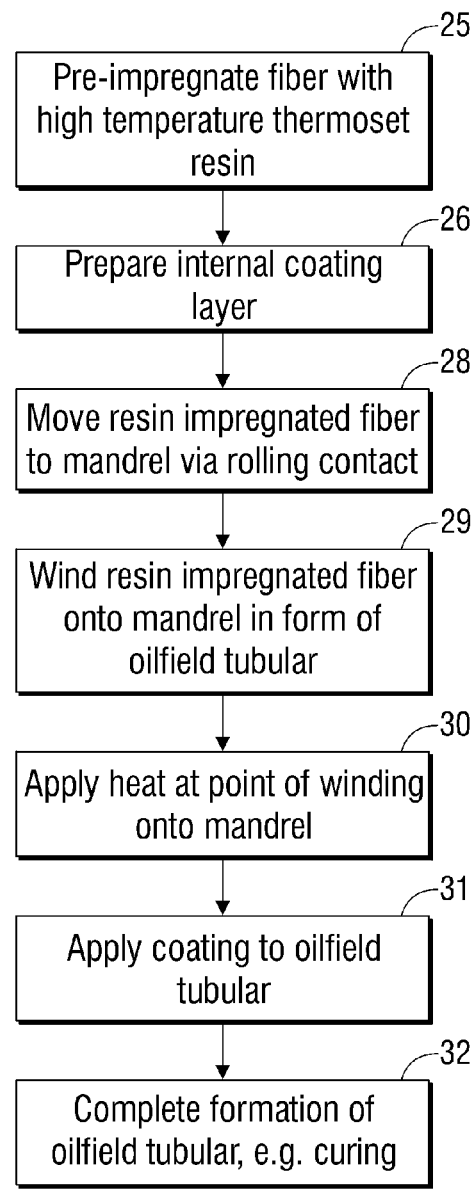
FIG. 2 is a flowchart illustrating another example of a methodology for forming a polymer composite tubular product for use in a well environment, according to an embodiment of the present invention.

One example of a more specific methodology for the manufacture of oilfield tubulars is illustrated by the flowchart of FIG. 2. In this embodiment, a fiber material is initially impregnated with a high temperature thermoset resin, as illustrated by block 25. If an internal coating is desired, a coating liner may be prepared for placement along an interior surface of the polymer composite oilfield tubular to protect the composite material from internal fluids routed through the tubular, as illustrated by block 26. The resin impregnated fiber structure is maintained at a cool temperature to avoid liquefaction and premature curing. Subsequently, the cool resin impregnated fiber (in the form of either a tow preg or slit tape) is delivered to a mandrel via rolling contact, as illustrated by block 28. The rolling contact enables much more precise control over tension acting on the resin impregnated fiber (i.e. tow preg or slit tape) which positively affects the fiber volume fraction in the finished product and ensures the integrity of the completed oilfield tubular.

After delivering the resin impregnated fiber (i.e. tow preg or slit tape) to the mandrel, the fiber is wound onto the mandrel to form the composite base structure of the oilfield tubular, as illustrated by block 29. During this process, heat is applied at the point where the fiber structure is wound onto the mandrel. Heat may be applied by a local external heat source, by heating the mandrel, or, preferably, by both means, to ensure that the high temperature thermoset resin liquefies sufficiently in-situ, i.e. attains an optimal processing viscosity range, so as to form a well consolidated, low void matrix, as depicted by block 30. Subsequently, a coating may be applied externally to the oilfield tubular structure, as illustrated by block 31. The coating is designed to protect the high temperature thermoset matrix by preventing contact between deleterious well fluids and the thermoset resin while the oilfield tubular is used in a downhole application. Upon application of the coating material, various completion processes are performed on the oilfield tubular. For example, the resin matrix and/or the coating material may be cured, as depicted by block 32. Alternatively, the outer coating may be applied after the underlying structure has been cured, as explained more fully below.

Figure 3:
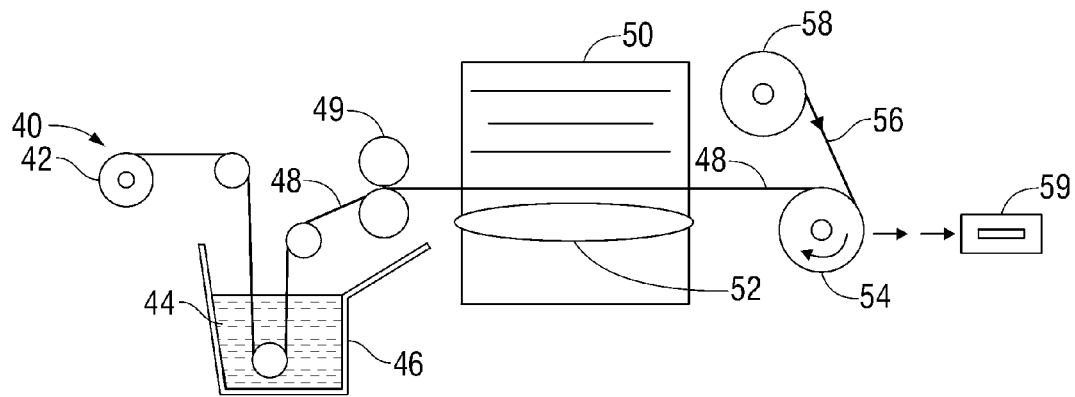
FIG. 3 is a schematic illustration of a system that can be used to combine fiber material with thermoset resin for delivery to a polymer composite tube construction station, according to an embodiment of the present invention.

Referring generally to FIG. 3, one example of a process for creating a resin impregnated fiber structure is illustrated. Depending on the application, the resin impregnated fiber structure may comprise a resin impregnated fiber, such as a single filament fiber or multifilament fiber. The resin impregnated fiber structure also may comprise resin impregnated tapes/sheets that can be slit to form slit tapes. Sometimes, the resin impregnated fiber structure is in the form of a tow preg which may be an individual fiber or a generally flat layer of parallel fibers impregnated with resin. The fiber impregnating or prepregging process involves application of formulated resin products, in solution or molten form, to the reinforcement fiber structure. This hot melt system uses resins with a very low percentage of solvents. As illustrated in the example of FIG. 3, a fiber structure 40 is delivered from a fiber supply 42, such as a roll. The fiber structure 40 is guided into a solution resin 44 disposed in a container 46 to create a resin impregnated fiber structure 48 which is then fed into a pair of nip rolls 49.

After passing through nip rolls 49, the resin impregnated fiber structure 48 is delivered through an oven 50, such as a heated horizontal or vertical oven. If oven 50 is a horizontal oven, it may employ a looping carrier 52. Once sufficient heat has been applied, the resin impregnated fiber structure may be rolled onto a wind-up roll 54, and separated by an interleaf material 56 delivered from a paper or poly interleaf roll 58. The roll of thermoset resin impregnated fiber structure, e.g. tow preg, sheet or tape, is maintained at a sufficiently cool temperature until delivery to a composite oilfield tubular construction assembly 59 at which the impregnated fiber structure 48 is used to form the base structure of the composite oilfield tubular. In an alternative approach, a hot melt process can be used to impregnate the fiber structure with resin through heat and pressure.

Figure 4:
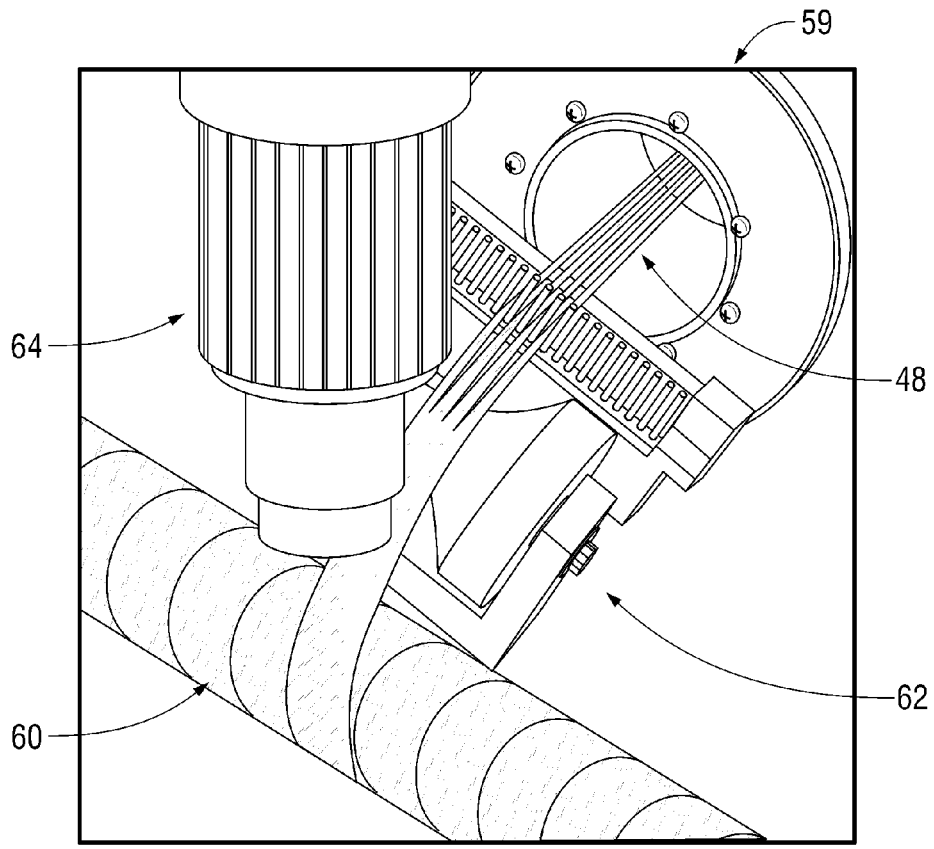
FIG. 4 is an illustration of a partial system for handling resin impregnated fibers and for winding the resin impregnated fibers onto a mandrel to create a composite tube, according to an embodiment of the present invention.

A portion of one embodiment of construction assembly 59 is illustrated in FIG. 4. In this example, the resin impregnated fiber structure 48, e.g. tow pregs or slit tapes, may be delivered to a mandrel 60 for winding. In the embodiment illustrated, the resin impregnated fiber structure is guided to mandrel 60 by one or more rollers 62 to provide a rolling contact with the resin impregnated fiber structure 48 instead of sliding contact. The rolling contact ensures the tow pregs or other structures do not incur undesirable levels of tension. In some applications, rollers 62 are mounted on bearings, such as ball bearings, to facilitate low tension movement of the resin impregnated fibers. Additionally, the resin impregnated fiber guides, e.g. rollers 62, are maintained at a relatively cool temperature to reduce the tackiness of the high temperature resin and to avoid prematurely liquefying and/or curing the resin. Given the relatively high melting temperature of the uncured resin, the cool temperature often can be achieved by using guides, e.g. rollers 62, with low thermal conductivity in combination with sufficient spatial separation from any heat sources. In some environments, additional coolers or cooling techniques may be employed to maintain the temperature of the resin impregnated fiber structure sufficiently low during transfer to mandrel 60.

Individual or plural resin impregnated fiber structures 48 are then wound over mandrel 60 to create a load bearing structure in the form of an oilfield tubular structure. During the winding process, mandrel 60 may be held at a temperature sufficiently high to maintain the resin matrix above the melting temperature of the uncured resin. It should be noted that depending on the type of resin and the time used for winding, some applications may incur some initial curing of the tubular structure on mandrel 60. Although mandrel 60 may be preheated, heat may also be added to the mandrel to maintain its temperature during processing. The preheat temperature and subsequent addition of heat is determined according to the uncured resin's melting temperature and the minimum and maximum allowable processing temperature of the materials. Alternatively, a variety of external heaters 64 can be employed at the point of winding to maintain sufficient heat in the composite material during the winding process. Preferably, both a heated mandrel and an external heater may be used.

When maintaining the temperature of the mandrel 60, the minimum allowable mandrel temperature may be governed by the processing window of the particular thermoset resin selected (e.g. resin melt viscosity is optimally 10 poise or less at the processing temperature for bismaleimide high temperature resin). The maximum allowable mandrel temperature is governed by the level at which thermal degradation occurs in the materials. Given that the mandrel tends to cool during the winding process, it often is desirable to add heat to maintain the mandrel temperature within the predetermined, acceptable temperature range. In some applications, such as with small mandrels and/or thin oilfield tubular wall structures, heater 64 may be the form of a heat gun that can be used to direct heat at the mandrel 60 while traversing from end to end of the mandrel 60.

Figure 5:
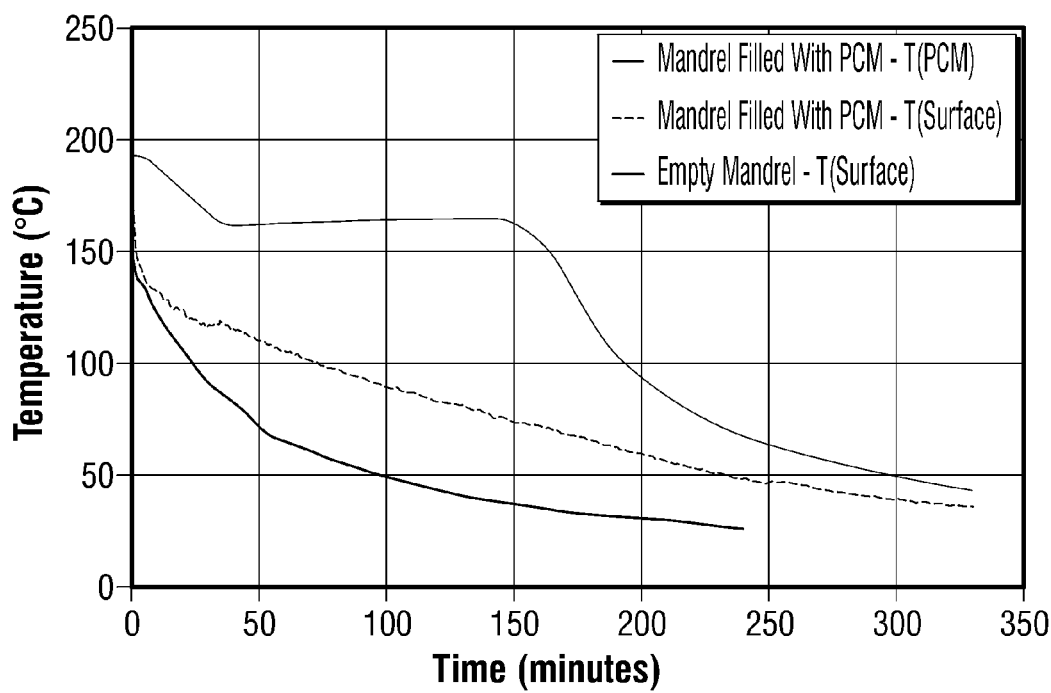
FIG. 5 is a graph representing mandrel temperatures when heated by a phase change material, according to an embodiment of the present invention.

However, other approaches for heating include supplying additional heat through the use of a phase change material that melts at a temperature within the target processing range and possesses a relatively high latent heat. The phase change material may be placed/encapsulated within the hollow mandrel so that it releases heat as it transforms back from a liquid to a solid upon cooling. An example of a suitable phase change material is a substance known as D-Mannitol (latent heat 341 Joules/gram, and melting temperature 165° C.). As illustrated in the graph of FIG. 5, the phase change material maintains substantial heat in the mandrel 60 for a relatively long period of time as compared to the preheated, empty mandrel represented by the lower graph line. Additional techniques for applying local external heating include the use of radiant heaters, such as hot gas (nitrogen) torch heaters and magnetic heaters. Additional techniques for heating the mandrel include inductive heaters and embedded electrical heating cartridges.

Figure 6:
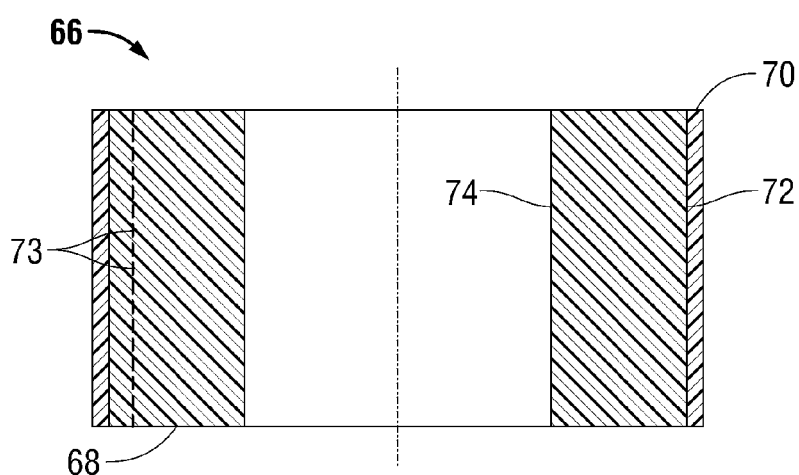
FIG. 6 is a cross-sectional view of a portion of a tubular product formed of a polymer composite material and coated on an outside surface for protection against invading information fluids, according to an embodiment of the present invention.

Upon completion of the winding and curing process, the oilfield tubular structure can be removed from mandrel 60 and coated with a protective layer designed to prevent exposure of the composite material to deleterious fluids when in a downhole environment. Referring generally to FIG. 6, a portion of an oilfield tubular 66 is illustrated in which a load bearing structure 68 has been formed from composite material, e.g.

high temperature fiber reinforced polymer, during the winding process illustrated in FIG. 4. Additionally, a coating material 70 has been applied to an exterior surface 72 to protect the structure 68. Following winding, the composite material is cured to form the load bearing structure 68. The curing process may be carried out after removal of the tubular structure 68 from mandrel 60. Additionally, the curing process may be performed after application of coating material 70. Depending on the type of coating material applied to structure 68, the coating material 70 may also be cured simultaneously with the structure 68. It should be noted that the winding/manufacturing process enables a variety of devices 73 to be embedded in or otherwise attached to the oilfield tubular 66. The devices 73 may comprise sensors, including wireless sensors, wires, fiber optics, and other devices that are embedded or otherwise attached during the winding stage or subsequent to the winding stage. Alternatively, open slots may be incorporated into the composite wall or a raised edge may be incorporated to act as a centralizer. Additionally, some metallic sections may be incorporated to provide depth position information for logging tools.

Figure 7:
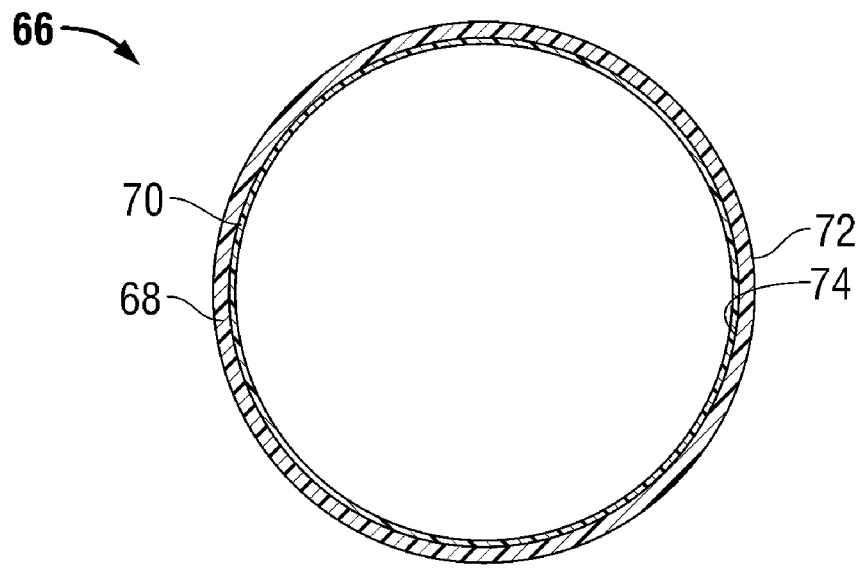
FIG. 7 is a cross-sectional view of a polymer composite tubular product to which a single layer of coating material has been applied along an interior surface, according to an embodiment of the present invention.
Figure 8:
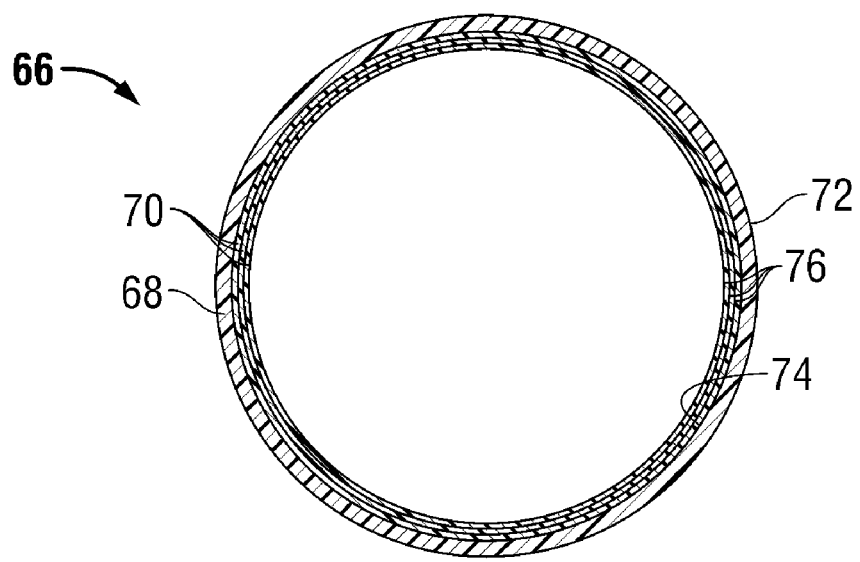
FIG. 8 is a cross-sectional view of a polymer composite tubular product to which a plurality of coating material layers has been applied, according to an embodiment of the present invention.

The coating material 70 need not be applied only to exterior surface 72. For example, the coating material 70 may also be applied to an interior surface 74 in addition to or as an alternative to the application on exterior surface 72. As illustrated in FIG. 7, for example, coating material 70 is applied to interior surface 74 of oilfield tubular 66 in a single layer. In FIG. 7, only one coating is illustrated along interior surface 74, but other embodiments apply coating material 70 to create coatings along both exterior surface 72 and interior surface 74. Additionally, multiple layers of coating material 70 can be applied, as illustrated in FIG. 8. In the specific example illustrated, three layers 76 of coating material 70 are applied along interior surface 74. However, other numbers of layers can be applied to interior surface 74 and/or exterior surface 72. By way of example, the inner coating liner may be positioned along interior surface 74 by initially applying the coating material 70 to mandrel 60 before winding the resin impregnated fiber structure over the coating material 70 to create the load bearing composite structure 68. The internal coating may be formed over mandrel 60 by a winding technique similar to that described for creating the composite structure 68.

Figure 9:
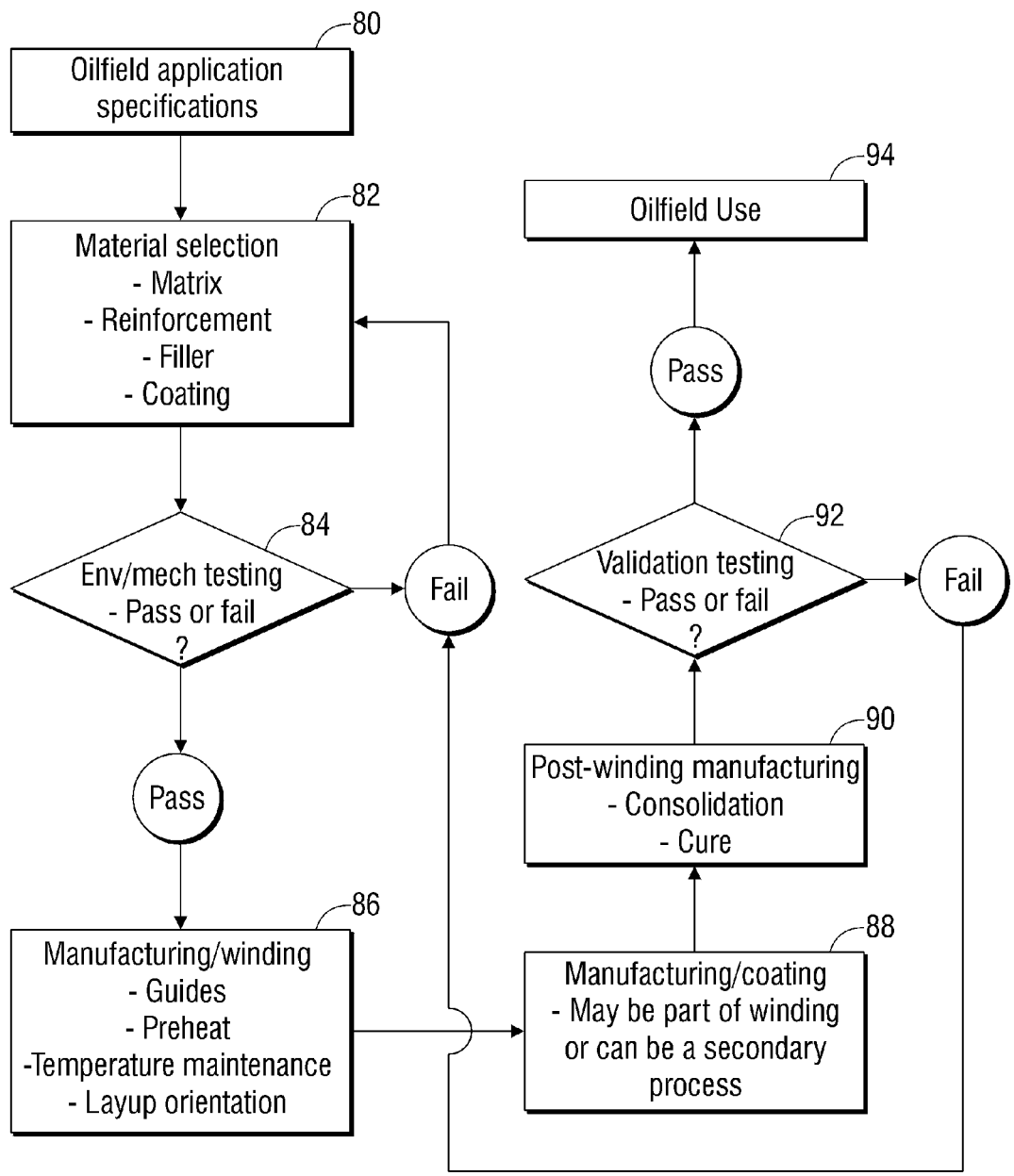
FIG. 9 is a flowchart illustrating one example of a comprehensive and systematic approach to selecting materials, constructing polymer composite tubular products, and ensuring such tubular products have substantial longevity when used in well environments, according to an embodiment of the present invention.

Referring generally to FIG. 9, one embodiment of a comprehensive and systematic methodology for determining, evaluating, manufacturing, testing, and using oilfield tubulars of polymer composite material is illustrated. In this embodiment, bismaleimide or another suitable high temperature thermoset resin is used in the manufacture of fiber reinforced polymer tubular products for downhole oilfield applications. The methodology employs a unique winding manufacturing process for oilfield tubulars formed from high temperature thermoset resin.

As an initial stage of the methodology, the oilfield application specifications are defined, as represented by block 80. Defining application specifications may include defining mechanical, thermal, chemical, electrical, sensor usage, life expectancy, and other pertinent requirements. Once the requirements are understood, appropriate materials are selected for construction of the oilfield tubulars that are to be used in the given oilfield application, as represented by block 82. The selection stage involves selecting appropriate thermoset resin and fiber material to establish a suitable load bearing tubular component, e.g. a casing/liner. However, the material selection stage may also comprise selecting appropriate coating materials and filler materials. The resin or matrix selected should be compatible with the fiber material and have sufficient strength to transfer loads acting on the oilfield tubular to the fibers while being resistant to the anticipated thermal and chemical environments of the downhole application.

As described above, the fiber material and thermoset resin are combined to form resin impregnated fiber structures, e.g. tow pregs or slit tapes, having a resin content and initial cure level selected to accommodate commercial prepreg techniques. The coating material is selected to be compatible with the high temperature thermoset resin to ensure that the coating material fully bonds to the matrix. The coating and/or sacrificial layer created and applied to the load bearing structure is designed to extend the operating life of the oilfield tubular by protecting the base structure. Filler materials may be selected and added to alter the flexural strength of the oilfield tubular or to affect other properties of the oilfield tubular. For example, filler materials may be selected to alter the conductivity of the oilfield tubular. When the oilfield tubular is to be used as casing for certain logging operations, the casing is designed to have at least a minimum conductivity to enable effective transfer of logging signals into the formation. In this type of application, conductive fillers are selected for mixing with the high temperature thermoset resins at predetermined concentrations. The type and level of filler determines the extent to which the ultimate oilfield tubular is electrically/thermally conductive. Often, substantial thermal conductivity can be achieved by using an electrically conductive medium. Examples of conductive fillers include carbon black. Concentrations of carbon black up to two percent, by weight, in the high temperature thermoset resin, can also assist in the winding stage by enhancing heat absorption without adversely affecting the electrical properties of the completed oilfield tubular.

The selection of materials also may be influenced by a variety of other considerations. For example, materials may be selected to avoid interference with the use of reservoir characterization tools that utilize nuclear, magnetic, acoustic, and/or inductive energy in their sensors. Fiber materials, such as basalt, E-glass, ECR-glass, R-glass, S-glass, quartz, and aramid fibers offer a range of performance in terms of transparency to various sensors, while also providing desirable thermal conductivity properties and mechanical properties. In other downhole applications that do not require the same level of transparency, other types of fibers, such as high strength metallic fibers, can be used in conjunction with the thermoset resins to provide desired strength characteristics for the oilfield tubular.

After selecting suitable materials for construction of oilfield tubulars to be used in a given downhole application, the materials may be tested, as illustrated by decision block 84. During the test stage of the present methodology, various tests, such as environmental and mechanical tests, can be performed with respect to the candidate materials and the overall composite component system. For example, mechanical tests can be performed on specimens of the composite, coated structure under selected pressure, temperature, and deleterious fluid conditions while observing the specimens. If the composite specimens fail the test procedures, the process is returned to material selection, as represented by block 82. If, however, a desired composite specimen passes the testing, the overall methodology may be continued by manufacturing oilfield tubulars, as represented by block 86.

In one embodiment of the methodology, manufacture of the polymer composite oilfield tubulars is performed on winding equipment, as described above. For example, the winding process described above can be used to continuously wind thermoset resin impregnated fiber structures onto a rotating mandrel to achieve the desired shape and size of each oilfield tubular. After winding and coating the base composite structure, the tubular component may be cured in an oven. As described above, the successful manufacture of the oilfield tubulars is facilitated by unique attributes of the manufacturing process. For example, the fiber structure guides, e.g. rollers 62, are maintained at a sufficiently cool temperature to minimize resin tackiness and/or to avoid liquefying the resin impregnated fibers prematurely. Because the resin impregnated fibers are susceptible to excess tension, tension is carefully controlled by utilizing rolling contact with the resin impregnated fibers. Additionally, the mandrel 60 is heated, e.g. pre-heated and/or subsequently heated, to maintain a temperature above the melting temperature of the uncured resin. Furthermore, changing the layup orientation of the resin impregnated fibers when winding the fibers onto mandrel 60 can affect the structural characteristics of the completed oilfield tubular.

During winding of the resin impregnated fiber structures onto mandrel 60, the orientation of the fibers can be adjusted to, for example, optimize strength and stiffness of the oilfield tubular for anticipated operational loads. Other parameters that affect the strength and stiffness of the oilfield tubular include structure thickness and the mass or volume percentage of resin. The winding phase of the manufacturing stage can be designed to enable winding of the composite material onto metallic end connectors. However, the winding process can also be designed to create fully composite end features, such as threaded ends or composite couplers that can be joined with high temperature adhesives. The unique manufacturing process also enables many types of devices 73, e.g. sensors, wires, fiber optics, and other devices, to be embedded in or otherwise attached to the oilfield tubular.

If an external coating is to be applied, coating material 70 may be applied to the composite structure following winding of the resin impregnated fiber structure to create the base composite structure 68 (FIG. 6), as represented by block 88. The coating material selected can vary depending on the type of thermoset resin used to form the base composite structure 68. For example, if bismaleimide resin is used, a maleimide based coating can be applied to the base composite structure. In this example, the coating material is a low modulus, hydrophobic coating useful with bismaleimide resins to resist the uptake of water and to act as a flexible, compliant layer/liner along the oilfield tubular. The coating materials may be combined with carrier materials that enable their use on filament winding equipment, such as the equipment used to create the composite base structure 68. As described above, such coating materials may also be applied to the inside diameter of the structure as part of the original winding process or as a post-winding process applied to the outside surface. The state of cure of the coating material and the cure procedure is varied according to the coating materials selected to optimize performance of the overall oilfield tubular. In the event of damage to the coating, embedded sensors 73 and/or external logging tools can be used to detect and monitor the ingress of downhole fluids, such as water, brine, hydrocarbons, or other internal or external fluids.

In some applications, spray coatings can be applied. For example, metallic impregnated resins can be applied with high velocity oxygen fuel spray. Such metallic impregnated resins, e.g. tungsten carbide, can be further impregnated with phenolic resin. Alternatively, organic materials, e.g. polyphenylene sulfide, can be applied by plasma spray techniques. In another example, ceramic materials, e.g. aluminum oxide, can be applied using thermal spray techniques.

Once the coating is applied, various post winding/coating procedures can be performed, as illustrated by block 90. In some applications, for example, the base structure and coating material undergo a simultaneous curing process. Also, given the high shrinkage and off-gassing that can especially affect high temperature thermoset resin systems, application of pressure through a porous medium can be used to ensure sufficient pressure is applied to consolidate the structure while the generated vapors and excess resin escape during curing. Finally, the completed oilfield tubular may be soaked in a non-aqueous fluid, such as dry hydrocarbon oil or silicone oil, before storage at ambient temperature. Such soaking reduces or eliminates the build up of residual stresses within the oilfield tubular upon cooling to ambient temperature, and reduces or eliminates moisture uptake by the oilfield tubular.

Following construction and curing of the completed oilfield tubular, validation testing can be conducted as indicated by decision block 92. For example, the composite oilfield tubular may be subjected to environmental tests that confirm the composite strength at temperature and in the presence of the expected deleterious fluids. During the validation testing, burst tests, leakage tests, and other suitable tests can be performed to evaluate the capabilities of the oilfield tubular in the intended downhole applications. If the oilfield tubular fails the validation testing, the process can be returned to the material selection stage 82. However, if the oilfield tubular passes the validation testing, the oilfield tubulars are approved for oilfield use in the subject environment, as indicated by block 94.

Figure 10:
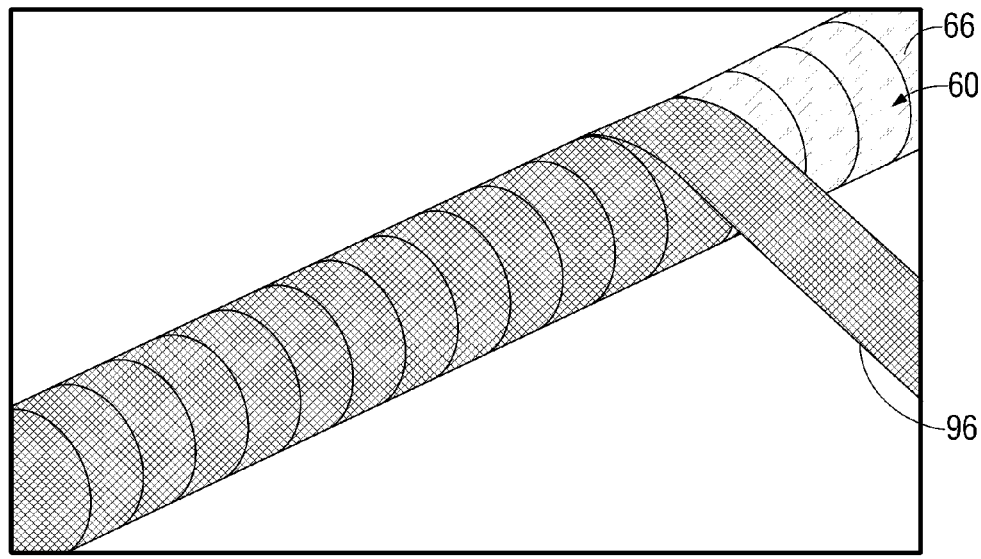
FIG. 10 is an illustration of one example of a post-winding procedure to facilitate formation of the desired polymer composite tubular product, according to an embodiment of the present invention.
Figure 11:
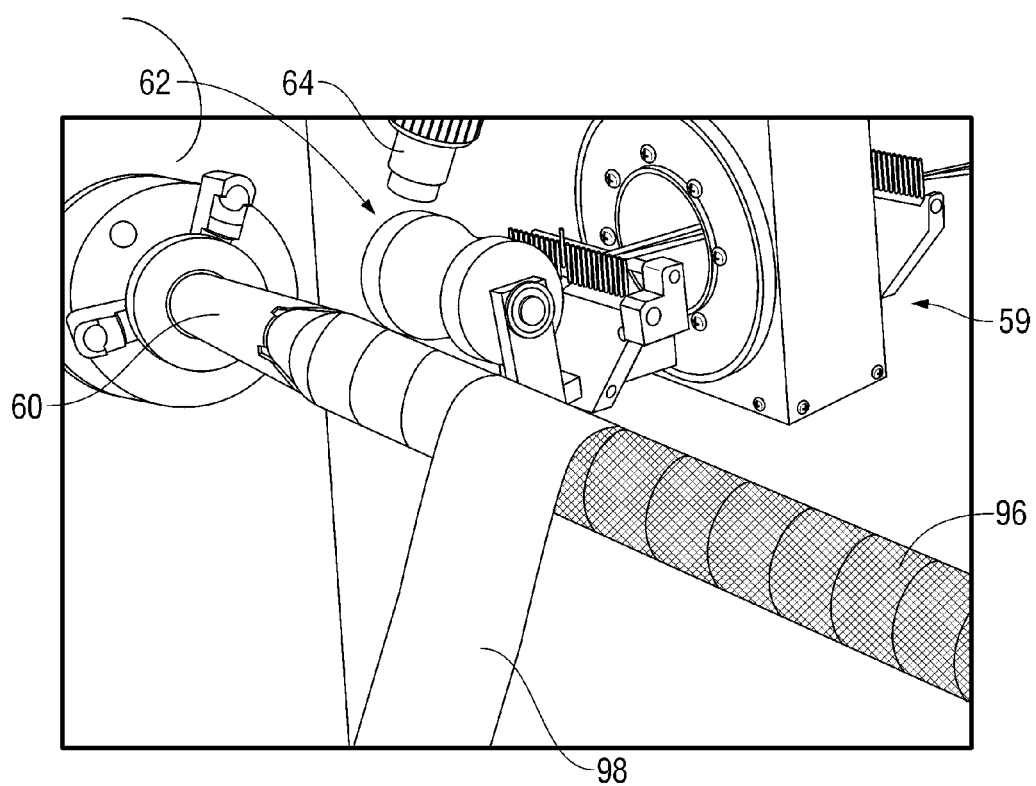
FIG. 11 is an illustration of another example of a post-winding procedure to facilitate formation of the desired polymer composite tubular product, according to an embodiment of the present invention.
Figure 12:
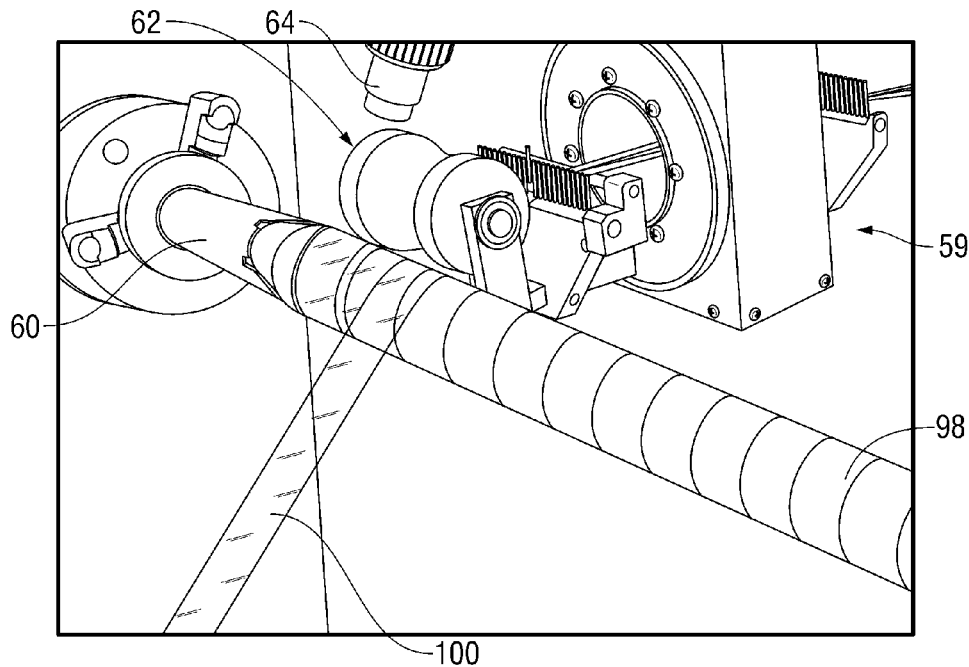
FIG. 12 is an illustration of another example of a post-winding procedure to facilitate formation of the desired polymer composite tubular product, according to an embodiment of the present invention.

Depending on the specific high temperature thermoset resins employed in constructing the polymer composite oilfield tubular, the post-winding processes may be designed to enhance the strength and longevity of the polymer composite oilfield tubulars. When bismaleimide high temperature resin is used in manufacturing the tubular base structure, certain techniques can be employed to apply pressure to enable consolidation of the structure while allowing the generated vapors and excess resin to escape. According to one example, a porous release layer 96, such as a peel ply, is applied directly to the substantially uncured fiber reinforced polymer oilfield tubular 66, as illustrated in FIG. 10. Subsequently, a breather cloth 98 is applied over release layer 96, as illustrated in FIG. 11. The breather cloth 98 also may serve as an absorbent layer. Additionally, a heat activated shrink tape 100 may be applied over the breather cloth 98, as illustrated in FIG. 12. The shrink tape 100 is perforated to enable escape of generated vapors and excess resin during application of pressure by heating the shrink tape 100. According to another implementation of a post-winding technique, a vacuum bag is applied over the release layer and absorbent material. Alternatively, an autoclave can be used instead of the shrink tape. Regardless of the specific implementation employed, the composite material and coating material are then cured to form the completed oilfield tubular.

Figure 13:
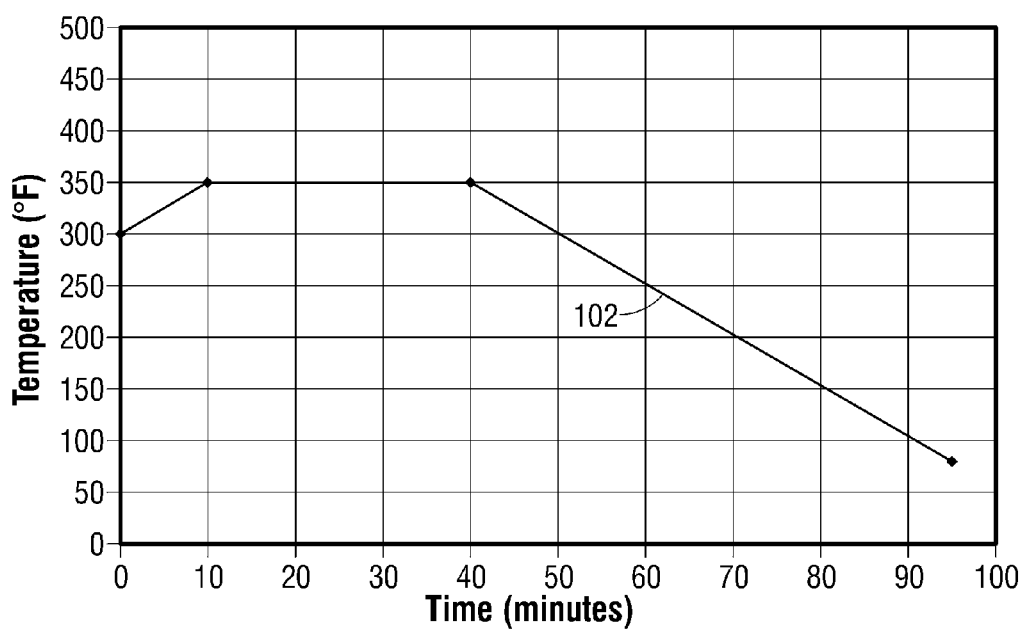
FIG. 13 is a graph representing an initial cure stage, according to an embodiment of the present invention.

The curing process can be adjusted according to the specific resins utilized and according to the desired, resultant characteristics of the polymer composite oilfield tubular, and may in some instances include radiation curing. One example of a curing process for use in curing bismaleimide resin structures, such as those described above, is illustrated in FIGS. 13-15. In this example, an initial or pre-cure stage is performed according to the temperature and time schedule represented by graph line 102 in FIG. 13. The oilfield tubular is placed in a curing oven held at a temperature of 300° F. The oven temperature is thereafter raised to 350° F., at a uniform rate of 5° F. per minute for 10 minutes. The temperature is then held at 350° F. for a period of 30 minutes, and thereafter decreased to ambient at a uniform rate of 5° F. per minute or less.

Figure 14:
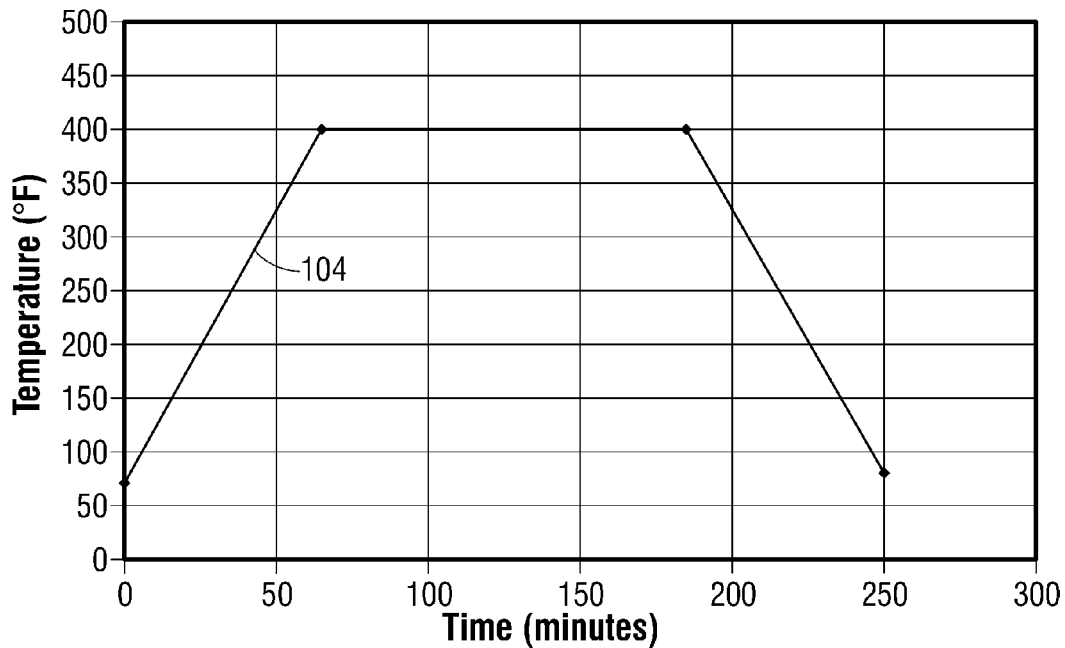
FIG. 14 is a graph representing a subsequent cure stage, according to an embodiment of the present invention.

Once the initial pre-cure stage is completed, the polymer composite tubular structure 66 is subjected to a main cure stage performed according to the temperature and time schedule represented by graph line 104 in FIG. 14. The oilfield tubular is placed in the cure oven at ambient temperature. The oven temperature is thereafter raised to 400° F., at a uniform rate of 5° F. per minute for 64 minutes. The temperature is then held at 400° F. for a period of 120 minutes, and thereafter decreased to ambient at a uniform rate of 5° F. per minute or less.

Figure 15:
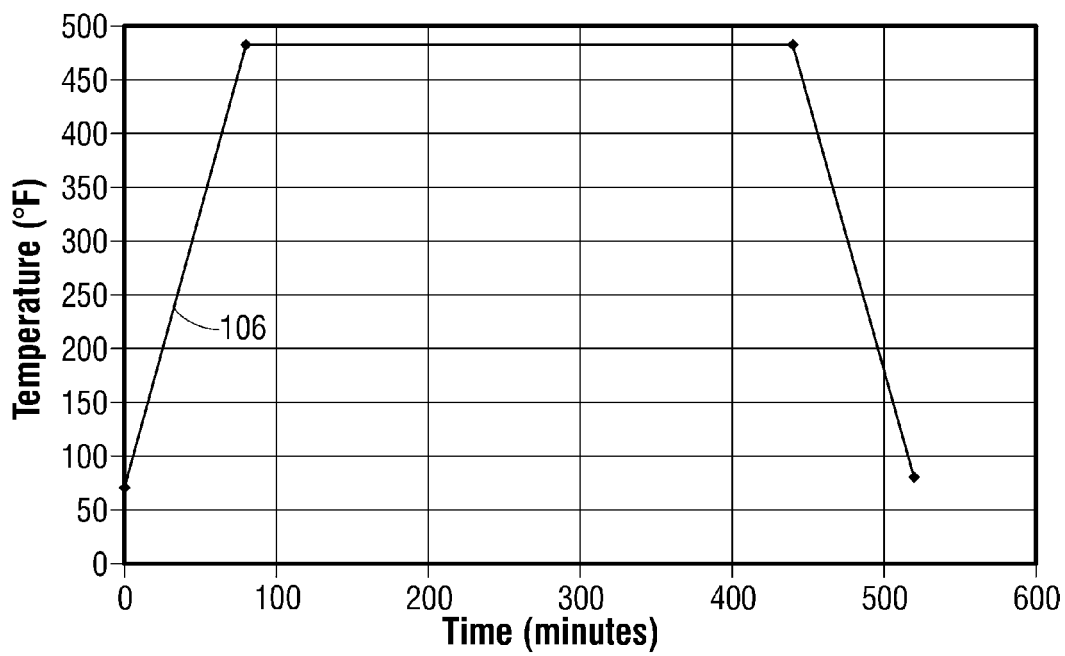
FIG. 15 is a graph representing a subsequent or post cure stage, according to an embodiment of the present invention.

Subsequently, a final or post-cure stage is performed according to the temperature and time schedule represented by graph line 106 in FIG. 15. The oilfield tubular is placed in the cure oven at ambient temperature. The oven temperature is thereafter raised to 482° F. at a uniform rate of 5° F. per minute. The temperature is then held at 482° F. for a period of 360 minutes, and thereafter decreased to ambient at a uniform rate of 5° F. per minute or less.

Upon completion of the cure stages, the polymer composite fiber reinforced tubular structure is ready for long-term use in the desired downhole environments. The curing stages can be performed sequentially or at separate time periods. Additionally, the curing process can be carried out at different stages during the manufacturing process depending on the materials, equipment, and manufacturing processes selected. However, the pre-cure stage must be carried out immediately following the completion of the winding process.

The high temperature fiber reinforced polymer composite oilfield tubulars may be constructed from a variety of thermoset resins, fiber materials, fillers, coating materials, and other additives depending on the intended well application. The potential tubing loads and environmental factors affect the materials selected for constructing the composite material base structure and for determining the coating applied to the base structure. Additionally, the methodology employed to manufacture the composite oilfield tubulars can be adjusted according to the material selected and according to the desired characteristics of the completed oilfield tubular. Furthermore, the size, shape and configuration of the composite oilfield tubulars may vary from one application to another. In some applications, a variety of devices, such as sensors and communication lines, can be formed within or attached to the oilfield tubulars.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A method of constructing an oilfield tubular, comprising:
combining a fiber material and a high temperature thermoset resin comprising bismaleimide to create a composite material, the high temperature thermoset resin having a melting temperature in an uncured state at which temperature the high temperature thermoset resin liquefies sufficiently for forming;
forming the composite material into a structure by winding the composite material around a mandrel while applying sufficient heat to the composite material at the point of winding to maintain the high temperature thermoset resin above its melting temperature; and
heat curing the composite material to complete the oilfield tubular, wherein the heat curing process comprises:
a pre-cure step consisting of exposing the composite material to a temperature of 300° F., increasing the temperature to 350° F. at a uniform rate of 5° F. per minute over a period of 10 minutes, holding the temperature at 350° F. for a period of 30 minutes, and decreasing the temperature to ambient at a uniform rate of 5° F. per minute or less;
a main cure step consisting of raising the temperature of the composite material from ambient to 400° F. at a uniform rate of 5° F. per minute for 64 minutes, holding the temperature at 400° F. for a period of 120 minutes, and decreasing the temperature to ambient at a uniform rate of 5° F. per minute or less; and
a post-cure step consisting of raising the temperature of the composite material from ambient to 482° F. at a uniform rate of 5° F. per minute, holding the temperature at 482° F. for a period of 360 minutes, and decreasing the temperature to ambient at a uniform rate of 5° F. per minute or less.

* * * * *